May 16, 1939.    F. A. BROWNE    2,158,781
CONVEYING MECHANISM
Filed Sept. 6, 1938    2 Sheets-Sheet 1

INVENTOR.
Floyd A. Browne.
BY Lawler & Lawler
ATTORNEYS.

May 16, 1939.　　　F. A. BROWNE　　　2,158,781
CONVEYING MECHANISM
Filed Sept. 6, 1938　　　2 Sheets-Sheet 2
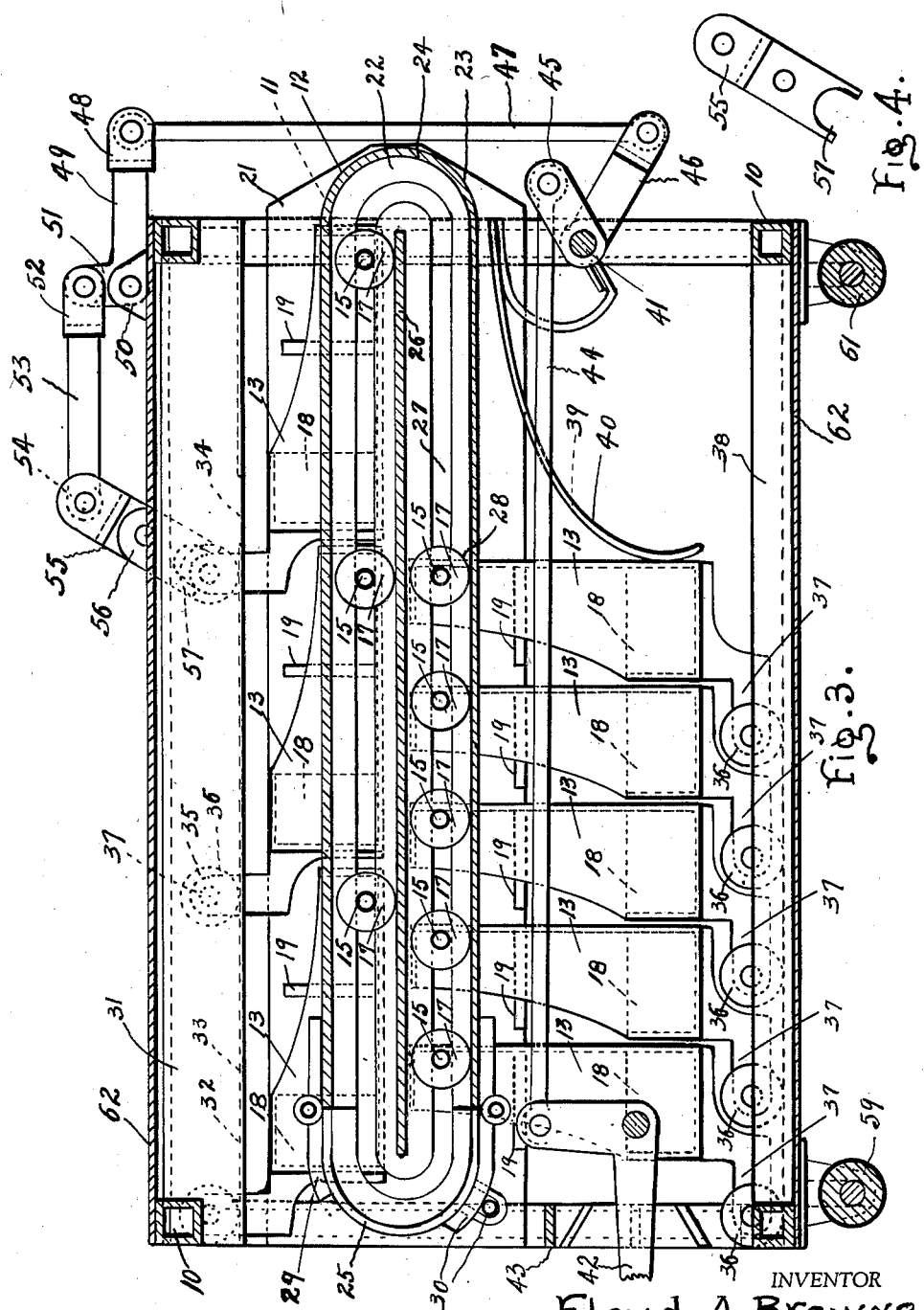

Patented May 16, 1939

2,158,781

UNITED STATES PATENT OFFICE 2,158,781

CONVEYING MECHANISM

Floyd A. Browne, Cleveland, Ohio, assignor of one-half to J. D. Overholt, Wooster, Ohio Application September 6, 1938, Serial No. 228,615

3 Claims. (Cl. 198—1)

The invention relates to a conveying mechanism more particularly as applied to a milk delivery system and the like, in which the material conveyed is manually emptied or unloaded from the receptacles. The receptacle is then refilled with empty containers such as milk bottles etc. and finally manually placed in another plane, leaving the next receptacle in place with its contents for subsequent delivery or deliveries.

According to the invention, when the conveying mechanism is loaded at the plant or dairy, all the receptacles are filled with products to be delivered to the respective customers. Some of the receptacles are placed in close side-by-side relation in the vertical plane, while others are placed end-to-end in the horizontal plane, so that all the receptacles are utilized. The conveying mechanism or a plurality of them may be then assembled in a unitary structure and mounted in a truck or milk wagon adapted to receive the same.

When the products contained in the first vertical receptacle have been delivered, and the space formerly occupied thereby refilled with empty containers, such as bottles, the receptacle is manually pulled forward and is then lifted and projected horizontally, so that it is positioned above those in the vertical plane in the ending guideway, supporting structure. The receptacle furthest remote from the incoming receptacle is released by means of a system of levers which control a stop or latch releasing member. After the receptacle is released it gravitates downward, where in its descent it is cushioned by spaced resilient fingers operatively associated with the lever system which ultimately forces the receptacle into its proper position in the vertical plane, thus positioning the next filled receptacle in place for subsequent delivery or deliveries.

Other objects of the invention will appear as the following description of a preferred and practical embodiment thereof proceeds.

In the drawings throughout the several figures, of which the same reference characters have been used to designate identical parts.

Figure 3 is a side view of the conveying mechanism taken on line A in Figure 1. The bottles are not shown in the receptacles.

Figure 4 is a detail view of the releasing instrumentality showing its bifurcated end.

Figure 1:
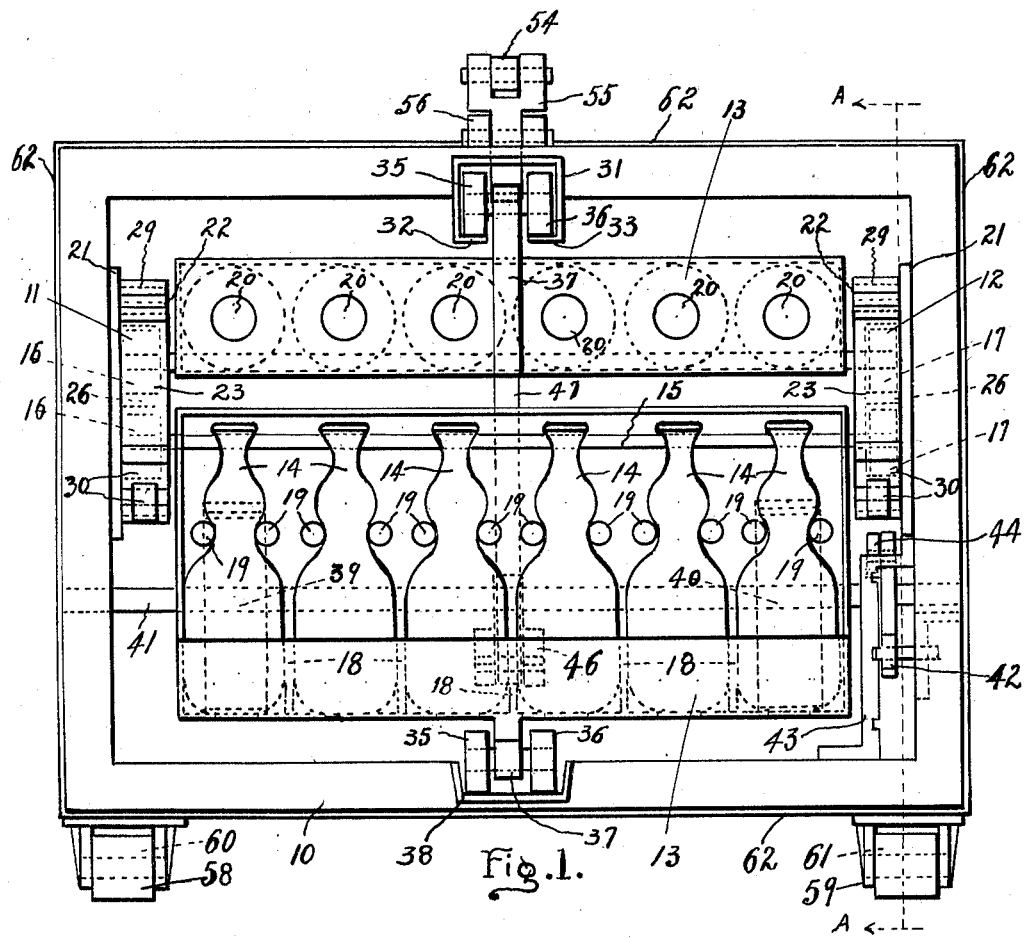
Figure 1 is an end view of the conveying mechanism showing bottles in the receptacles in both the vertical and horizontal planes.
Figure 2:
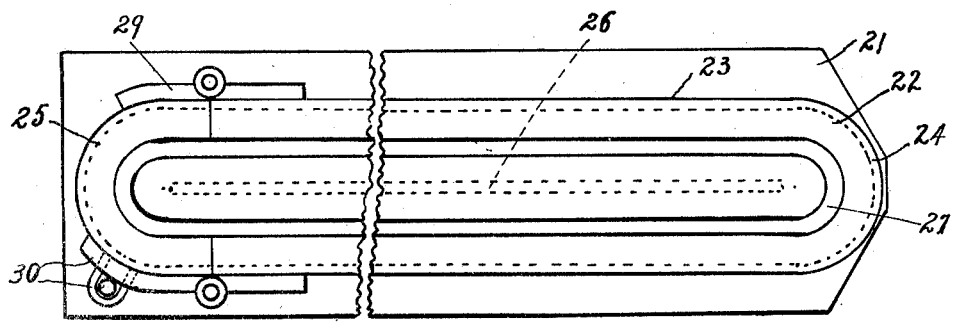
Figure 2 is a fragmentary view of a track detached from the conveying mechanism showing its construction.

Referring now in detail to the several figures the numeral 10 represents a supporting structure which may be of any desired practical construction but as here shown includes a frame having incorporated therein two spaced endless track or guiding members 11 and 12 arranged longitudinally with respect to the direction in which the receptacles are to be moved. The receptacles 13—13 are identical in construction, so that a description of one will suffice for all. The receptacles are positioned transversely in the supporting structure, and are fashioned to receive containers or bottles 14—14 of predetermined size and weight. The upper portion of the receptacle is supported by a transverse shaft 15 having wheels 16 and 17. The lower end of the receptacle is of a U shaped configuration and is provided with spaced separators 18—18, adapted to prevent the bottles or containers from contacting one another when placed therein. The receptacle is also provided with pins or clamps 19—19 adapted to hold the bottles in alignment in the receptacle. In the bottom of the receptacle there is provided a number of through openings or apertures 20—20 adapted to allow the water used in washing same to drain therefrom.

Referring to the tracks or guideways 11 and 12 which are identical in their structure, so that a description of one will suffice for both. The guide or track member comprises a pair of side walls 21 and 22 joined transversely by a continuous wall 23 having rounded ends 24 and 25, and a longitudinally extending intermediate member 26 which terminates so as to leave ample space at each end so that the roller on the shaft supporting the receptacle can pass therearound without fouling its movement. The side wall 22 is provided with an orbital course or endless slot 27 designed for the reception of an end portion of the transverse shaft 15, and also to keep the receptacle in alignment in the support.

The roller on the end of the shaft is mounted in the track or guiding member as at 28 in Figure 3. It will be noted that the rollers ride on members 26 when the receptacle is in the horizontal plane or position, and on the lower portion of the continuous wall 23 when in the vertical position as shown in Figure 3. The slot or orbital course 27 guides the receptacle rollers in their proper course and also acts as a bearing or supporting surface for the shaft after the rollers leave the end of the intermediate supporting member 26, thereby permitting the receptacle to be directed into its proper position either in the vertical or horizontal plane.

One end of each track member is provided with a hinge 29 locking means 30. The hinge is adapted to permit the end portion of the track to be opened, so that the receptacles may be removed from the device for cleaning and loading.

Intermediate the guiding track means there is provided an upper longitudinally extending carriage supporting member 31 having flanges 32 and 33. In the flanges there is provided an interruption as at 34 ample to permit the plural wheels 35 and 36 on the carriage 37 fixed to the lower portion of the receptacle to pass therethrough after the carriage has been released from the releasing instrumentality 55 controlled by a system of manually operated levers and connected rods.

A longitudinally extending trough or guide 38 is positioned directly below and in alignment with the upper flanged carriage supporting member in the bottom of the supporting structure, and is adapted to guide the plural wheels on the carriage when the receptacle is in the vertical plane. This guideway also tends to keep the receptacle in alignment with the endless track member.

A pair of spaced resilient finger members 39 and 40 fixed to the transverse shaft member 41 mounted in the frame structure, normally urge the receptacle into place when the lever system is locked against actuation. The shape of the resilient spaced finger members adjacent the receptacle is such that when they are in contact therewith they tend to force the receptacle forward against their inherent resilient action.

When the lever 42 is released from its locking rack 43 and is forced down the rod 44 is moved forward carrying with it in its movement the lever 45 to which it is attached. The lever 45 is fast on the transverse shaft member 41 on which the resilient fingers are also fast. Intermediate the resilient fingers there is provided a lever 46 also fast on the shaft member 41. A rod 47 is connected at one end to the lever 46, its other end being connected to the arm 48 of the bell crank lever 49 pivotally mounted in the bracket 50 on the supporting structure. The other arm 51 of the bell crank is connected to the end 52 of the rod 53, the other end 54 of the rod 53 is connected to the releasing member 55 that is pivotally mounted in the bracket 56 on the supporting structure. The end 57 of the releasing member is bifurcated for the reception of a portion of the carriage 37 fixed to the lower portion of the receptacle. When the releasing member is manually released, the receptacle gravitates downward and its decent is retarded and cushioned by coming into contact with the resilient fingers which guides the receptacle into its proper position in the vertical plane as shown in Figure 3.

The supporting structure is provided with rollers 58, 59, 60 and 61 to permit moving the device. The structure is provided with a suitable insulating material 62, and may be refrigerated from a single source sufficient to afford the desired amount of refrigeration required by the products handled.

Since the operation of the various sets of mechanism by which the purpose of the apparatus is achieved have been described, in connection with the description of said mechanism, it is believed a resume of the operation of the entire conveying mechanism is unnecessary.

I am aware that my invention may be embodied in other specific forms without departing from a spirit or essential attributes thereof; and I therefore desire that the present embodiment be considered in all respects as illustrative and not restrictive, reference being had to the appended claims rather than the foregoing description to indicate the scope of the invention.

What I claim as new and desire to secure by Letters Patent of the United States is:

1. A conveying mechanism comprising a supporting structure, oppositely arranged longitudinally extending means having an orbital course therein mounted in the structure, a longitudinally extending flanged guiding means intermediate the aforesaid means having an interruption in the flanges thereof, a longitudinally extending lower guiding means positioned below the flanged guiding means at the bottom of the structure, a plurality of receptacles, a plurality of shafts, each receptacle being supported by an individual shaft, rollers carried on each end of each shaft and mounted in the oppositely arranged longitudinally extending means having the orbital course therein, a carriage integral with the receptacle having plural rollers adapted to support the receptacle in the horizontal plane when mounted in the flanged longitudinally extending means, and being further adapted to ensure rectilinear movement of the receptacle in the vertical position, manually operable means frictionally-engaging a receptacle and adapted to move the receptacle in the vertical plane, and being further adapted to cushion the impact of a released receptacle after the receptacle has been released from the flanged guiding means through the interruption therein said manually operable means retaining the receptacle by means under its control.

2. A conveying mechanism comprising a supporting structure, oppositely arranged longitudinally extending means having an orbital course therein mounted in the structure, a longitudinally extending flanged guiding means intermediate the aforesaid means having an interruption in the flanges thereof, a longitudinally extending lower guiding means positioned below the flanged guiding means at the bottom of the supporting structure, a plurality of receptacles, a plurality of shafts, each receptacle being supported by an individual shaft, plural rollers on each shaft and mounted in the oppositely arranged longitudinally extending means having the orbital course therein, means to permit removal of the receptacles from the oppositely arranged longitudinally extending means, a carriage integral with the receptacle having plural rollers adapted to support the receptacle in the horizontal plane when mounted in the flanged longitudinally extending means, and being further adapted to ensure rectilinear movement of the receptacle in the vertical position, manually operable resilient means adapted to cushion the impact of a released receptacle in its descent after its release from the flanged guiding means through the interruption therein, and being further adapted to maintain the movement of the released receptacle so that it is led into a vertical position behind a receptacle vertically positioned in advance thereof, said manually operable means incorporating and controlling means for releasably holding the receptacle previous to its release through the interruption in the flanged guiding means.

3. A conveying mechanism comprising a supporting structure, oppositely arranged longitudinally extending means having an orbital course therein mounted in the structure, a longitudinally extending flanged guiding means intermediate the aforesaid means having an interruption in the flanges thereof, a longitudinally extending lower guiding trough positioned below the flanged guiding means at the bottom of the structure, a plurality of receptacles, a plurality of transverse shafts, each receptacle being supported on an individual transverse shaft, plural rollers carried on each shaft and mounted in the oppositely arranged longitudinally extending means having an orbital course therein, a carriage integral with the receptacle provided with plural rollers adapted to support the receptacle in the horizontal plane when mounted in the flanged longitudinally extending guiding means, and being further adapted to insure rectilinear movement of the receptacle in the vertical plane, manually operable resilient fingers adapted to alter the gravitational movement of a receptacle so that its movement is constrained to effect its position after it has been released from the flanged guiding means through the interruption in the flanges by a releasing means, said resilient fingers and releasing means being manually actuated by a system of interconnected levers and rods.

FLOYD A. BROWNE.